US012359491B2

(12) United States Patent
Penato

(10) Patent No.: US 12,359,491 B2
(45) Date of Patent: Jul. 15, 2025

(54) CAM RELEASE SYSTEM FOR JACKSHAFT CONVERSION FROM A CEILING GARAGE DOOR OPENER

(71) Applicant: ASSA ABLOY Entrance Systems AB, Landskrona (SE)

(72) Inventor: Edoardo Umberto Penato, Cislago (IT)

(73) Assignee: ASSA ABLOY Entrance Systems AB, Landskrona (SE)

( * ) Notice: Subject to any disclaimer, the term of this patent is extended or adjusted under 35 U.S.C. 154(b) by 0 days.

(21) Appl. No.: 18/086,763

(22) Filed: Dec. 22, 2022

(65) Prior Publication Data

US 2024/0209672 A1 Jun. 27, 2024

(51) Int. Cl.
*E05F 15/67* (2015.01)

(52) U.S. Cl.
CPC ........... *E05F 15/67* (2015.01); *E05Y 2201/11* (2013.01); *E05Y 2201/214* (2013.01); *E05Y 2201/604* (2013.01); *E05Y 2201/638* (2013.01); *E05Y 2201/68* (2013.01); *E05Y 2201/716* (2013.01); *E05Y 2900/106* (2013.01)

(58) Field of Classification Search
None
See application file for complete search history.

(56) References Cited

U.S. PATENT DOCUMENTS 3,512,302 A 5/1970 Sivin et al.
4,472,910 A * 9/1984 Iha ........................ E05F 15/668 74/625

(Continued)

FOREIGN PATENT DOCUMENTS

CA 2297220 A1 3/2001
EP 2383411 A1 11/2011

(Continued)

OTHER PUBLICATIONS

International Search Report and Written Opinion from corresponding International Application No. PCT/EP2023/085825 mailed Mar. 11, 2024, all pages cited in its entirety.

(Continued)

*Primary Examiner* — Marcus Menezes
(74) *Attorney, Agent, or Firm* — Burr & Forman LLP

(57) ABSTRACT

A transmission assembly for converting between a ceiling mounted to a jackshaft configuration includes an output coupler for operably coupling a drive tube rotatable to open and close a sectional door, a pinion assembly operably coupled to the output coupler via a flexible coupling member, a releasable coupling assembly, a handle, and a cam operated engagement assembly. The releasable coupling assembly is operably coupled to a motor output shaft of a GDO motor. The releasable coupling assembly has an engaged state in which rotation of the motor output shaft is transferred to the pinion assembly and a disengaged state in which the rotation of the motor is not transferred to the pinion assembly. The cam operated engagement assembly is operably coupled to the handle and the releasable coupling assembly to transition the releasable coupling assembly between the engaged state and the disengaged state based on a position of the handle.

20 Claims, 9 Drawing Sheets

(56) References Cited

U.S. PATENT DOCUMENTS

| | | | | |
|---|---|---|---|---|
| 4,560,046 | A * | 12/1985 | Lorello | E05F 15/668 56/11.6 |
| 5,222,327 | A | 6/1993 | Fellows et al. | |
| 5,743,046 | A | 4/1998 | Siegler et al. | |
| 6,557,301 | B1 * | 5/2003 | Hormann | E05B 65/0021 49/139 |
| 7,481,133 | B2 * | 1/2009 | Walravens | E05F 15/603 49/140 |
| 7,997,324 | B2 * | 8/2011 | Olmsted | E05F 15/686 160/188 |
| 8,480,526 | B2 | 7/2013 | Nicholson | |
| 8,935,883 | B2 | 1/2015 | Coubray et al. | |
| 9,027,281 | B2 | 5/2015 | Shalom | |
| 9,115,792 | B2 | 8/2015 | Skotty | |
| 9,217,283 | B2 | 12/2015 | Olmsted | |
| 9,963,899 | B2 | 5/2018 | Stokes, Sr. | |
| 10,000,960 | B2 | 6/2018 | Angiuli et al. | |
| 10,157,538 | B2 | 12/2018 | McNabb et al. | |
| 10,407,971 | B2 | 9/2019 | Dey et al. | |
| 10,544,613 | B2 | 1/2020 | Tsui et al. | |
| 11,428,038 | B2 | 8/2022 | Skotty et al. | |
| 11,486,183 | B2 | 11/2022 | Sostarecz | |
| 2004/0211279 | A1 | 12/2004 | Walravens et al. | |
| 2021/0047873 | A1 | 2/2021 | Cate et al. | |
| 2021/0131162 | A1 | 5/2021 | Matthews et al. | |
| 2021/0262498 | A1 | 8/2021 | Nykilchuk et al. | |
| 2021/0381557 | A1 | 12/2021 | Dang et al. | |
| 2022/0056751 | A1 | 2/2022 | Mastros et al. | |
| 2022/0259913 | A1 | 8/2022 | Williams et al. | |

FOREIGN PATENT DOCUMENTS

| | | | |
|---|---|---|---|
| WO | 0050720 | A1 | 8/2000 |
| WO | 2012048953 | A1 | 4/2012 |

OTHER PUBLICATIONS

Swedish Search and Examination report from corresponding Swedish Application No. 2330049-4 mailed Sep. 22, 2023, all pages cited in its entirety.

* cited by examiner

FIG. 7.
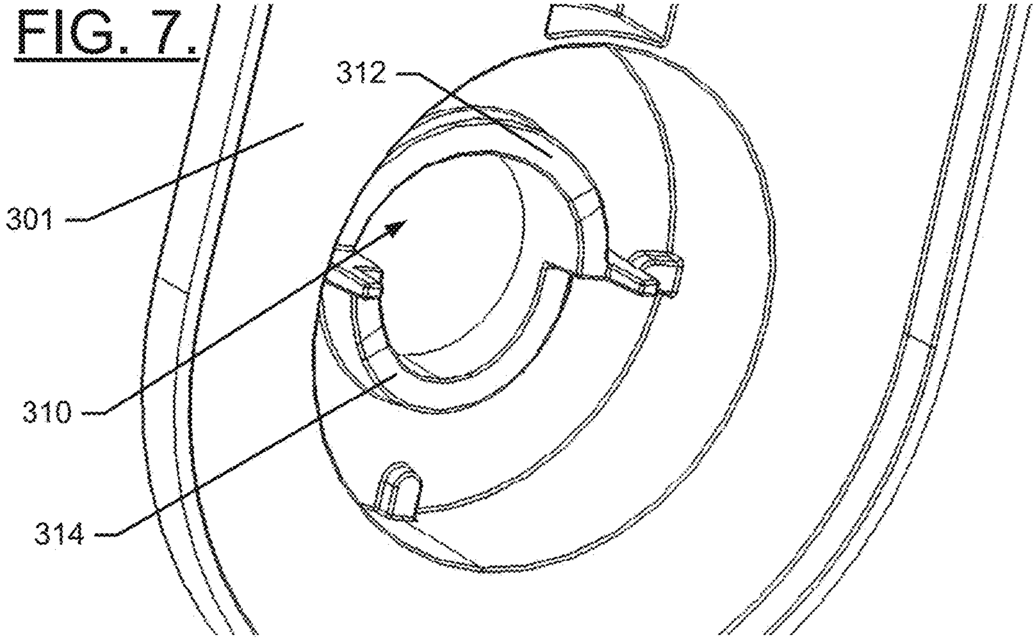
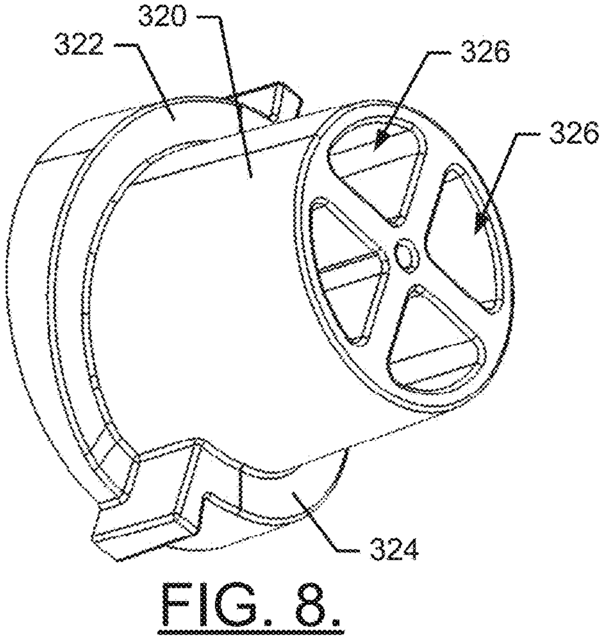
FIG. 8.
FIG. 9.
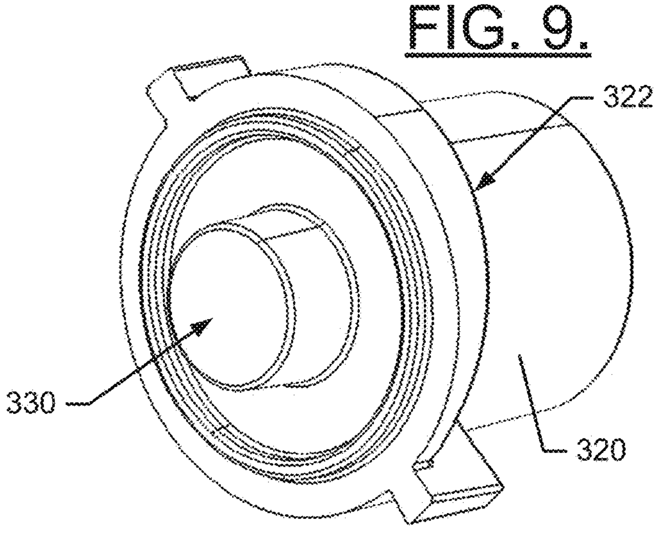

FIG. 10.
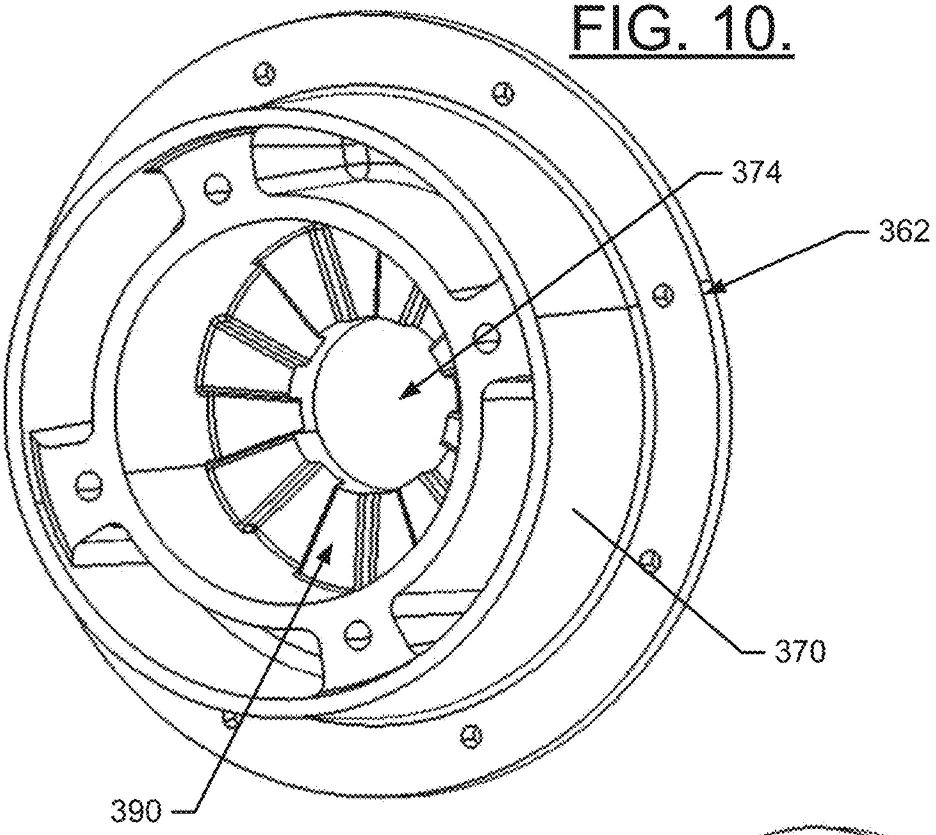
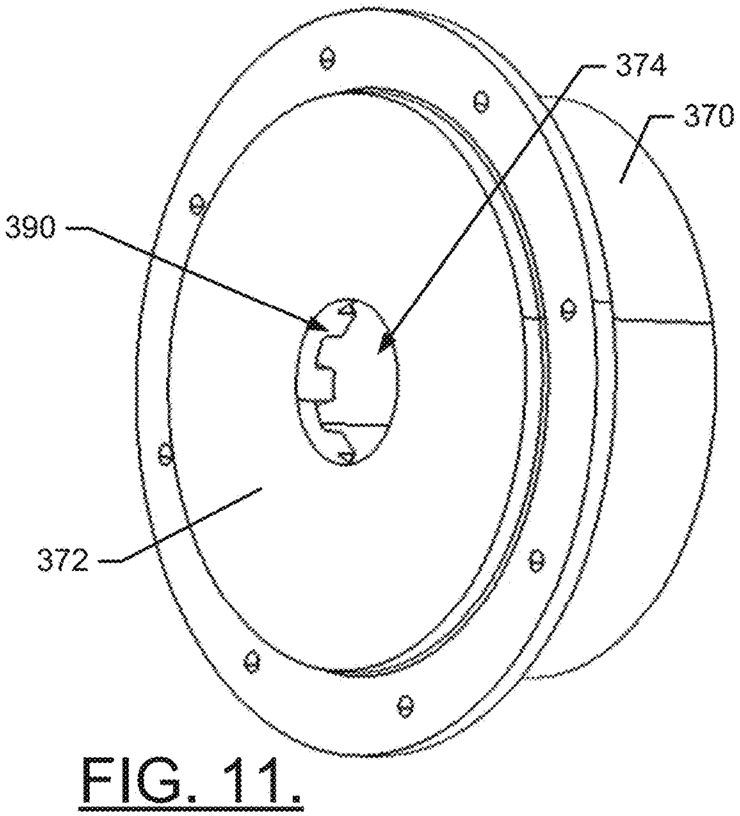
FIG. 11.

FIG. 12.
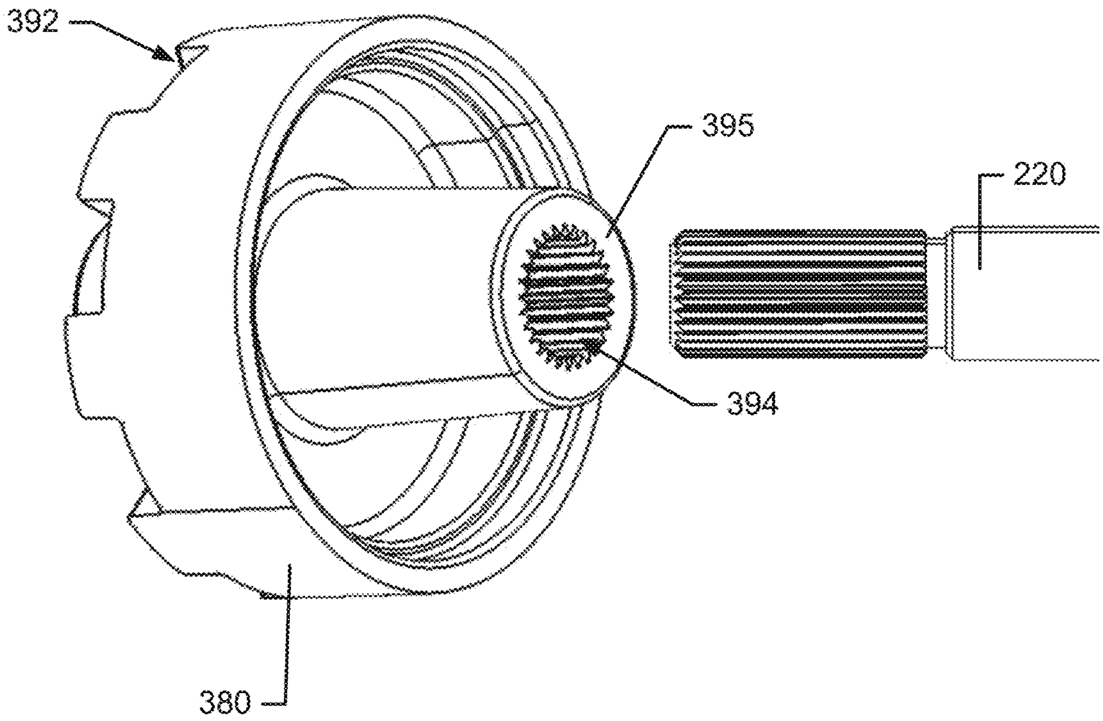
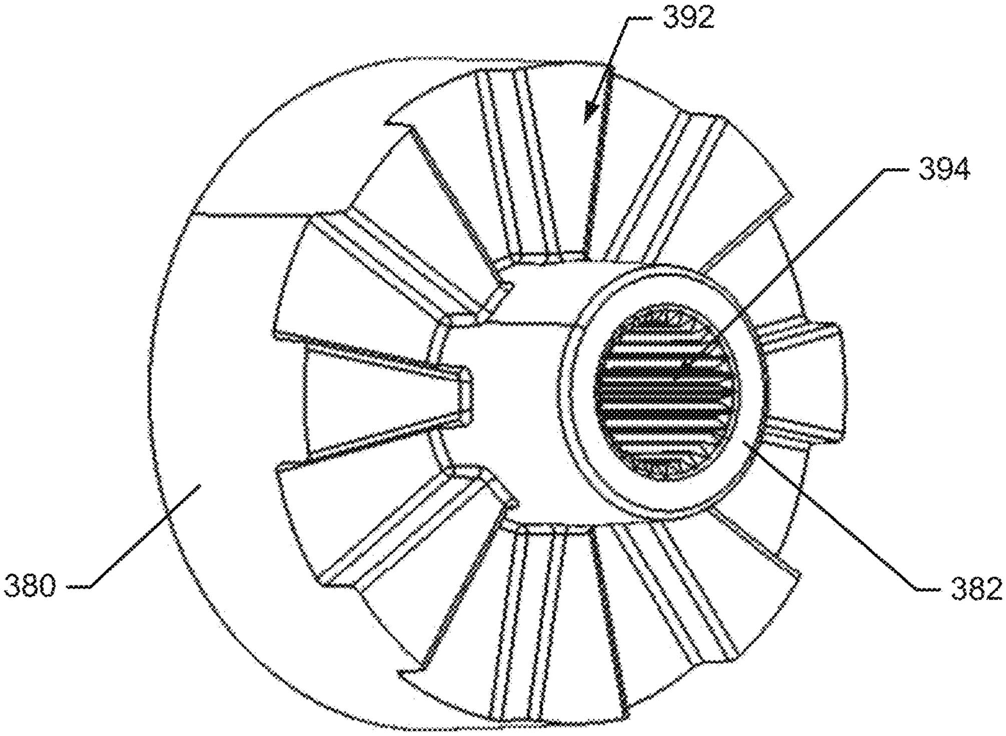
FIG. 13.

CAM RELEASE SYSTEM FOR JACKSHAFT CONVERSION FROM A CEILING GARAGE DOOR OPENER

TECHNICAL FIELD

Example embodiments generally relate to garage door operators (GDOs) and, in particular, relate to a release system for a GDO that is convertible to jackshaft configuration from ceiling operation.

BACKGROUND

There have long been multiple solutions for providing residential GDOs. One such solution is for ceiling mounted GDOs that have a ceiling mounted linear force operator that drags one of the connected sections of the sectional door through the guides the door rides in between open and closed positions. Another solution, referred to as a jackshaft GDO, is a rotary torque operator mounted on the drive tube or shaft that rotates drums at opposing ends thereof. The drums coil and uncoil cables connected to the sectional door to pass the door through the guides between open and closed positions. Until recently, these two solutions have been provided in two relatively distinct channels with customers choosing products in one category for jackshaft GDOs and products from another category for ceiling mounted GDOs.

More recently, thought has been given to providing a single product that can be installed in either configuration (e.g., ceiling mounted or jackshaft). Thus, for example, the product may be installed as a ceiling mounted GDO (in what is sometimes called a trolley configuration), and then converted to be reinstalled in the jackshaft configuration, if desired. One way to make the single product work in either configuration may be to provide a transmission component that effectively acts as an adapter when added to the unit when transitioning from the trolley configuration to the jackshaft configuration. However, even this conversion technique may come with certain problems. One such problem comes in relation to the need to allow the sectional door to be released from connection to the GDO for manual opening (e.g., in case of loss of electrical power, a mechanical malfunction, or the like).

As an example, it is common for GDOs in the trolley configuration to have a manual release system that involves a physical release of the trolley and the belt, chain or cable that moves the trolley powered by the motor of the GDO from coupling to the sectional door. For the jackshaft configuration, there is no trolley to disconnect, so a different release is typically provided. The release normally provided for the jackshaft configuration may include a decoupling of the gears that turn the shaft from the GDO motor. When providing a conversion option, the transmission used for conversion may be considered “non-native” and may not be compatible with the typical jackshaft release system.

The incompatibility could be dealt with in multiple ways, but the way that is best will depend on the initial characteristics of the GDO. For example, if the GDO is initially configured to operate in the trolley configuration, it will likely use the manual release of the trolley described above, so in conversion, the normal release mechanism will not be useable after configuration to the jackshaft configuration. Thus, for example, it may be preferable to instead provide a release system directly in the jackshaft conversion kit. Presently, the only known solution in the market achieves this by loosening the belt tension in the transmission in order to loosen the coupling with the pinion. However, acting on the tensioning system (e.g., of a belt or chain) creates mechanical uncertainty in the tensioning components that can be problematic, so a better solution is desirable.

BRIEF SUMMARY OF SOME EXAMPLES

In an example embodiment, a transmission assembly for converting a garage door operator (GDO) from a ceiling mounted configuration to a jackshaft configuration may be provided. The transmission assembly may include an output coupler for operably coupling a drive tube rotatable to alternately open and close a sectional door, a pinion assembly operably coupled to the output coupler via a flexible coupling member, a releasable coupling assembly, a handle, and a cam operated engagement assembly. The releasable coupling assembly may be operably coupled to a motor output shaft of a GDO motor. The releasable coupling assembly may have an engaged state in which rotation of the motor output shaft is transferred to the pinion assembly and a disengaged state in which the rotation of the motor is not transferred to the pinion assembly. The cam operated engagement assembly may be operably coupled to the handle and the releasable coupling assembly to transition the releasable coupling assembly between the engages state and the disengaged state based on a position of the handle.

In another example embodiment, a garage door operator (GDO) system may be provided. The system may include a sectional door movable on rails between an open position and a closed position, a GDO motor operable to provide power for movement of the sectional door between the open and closed positions via turning of a drive tube in a jackshaft configuration or via movement of a trolley in a ceiling mounted configuration, and a transmission assembly for enabling conversion from the ceiling mounted configuration to the jackshaft configuration. The transmission assembly may include an output coupler for operably coupling to the drive tube for rotation to alternately open and close a sectional door, a pinion assembly operably coupled to the output coupler via a flexible coupling member, a releasable coupling assembly, a handle, and a cap operated engagement assembly. The releasable coupling assembly may be operably coupled to a motor output shaft of the GDO motor. The releasable coupling assembly may have an engaged state in which rotation of the motor output shaft is transferred to the pinion assembly and a disengaged state in which the rotation of the motor is not transferred to the pinion assembly. The engagement assembly may be operably coupled to the handle and the releasable coupling assembly to transition the releasable coupling assembly between the engages state and the disengaged state based on a position of the handle.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 7 illustrates an internal elevation view of a first cover member in accordance with an example embodiment;

FIG. 8 illustrates an isolated perspective view of a cam base in accordance with an example embodiment;

FIG. 9 illustrates an alternative isolated perspective view of the cam base in accordance with an example embodiment;

FIG. 10 illustrates a perspective view of a coupling assembly enclosure in accordance with an example embodiment;

FIG. 11 illustrates an alternative perspective view of the coupling assembly enclosure in accordance with an example embodiment;

FIG. 12 illustrates a perspective view of a coupling gear being inserted on a motor output shaft in accordance with an example embodiment; and FIG. 13 illustrates an alternative perspective view of the coupling gear in accordance with an example embodiment.

DETAILED DESCRIPTION

Figure 1:
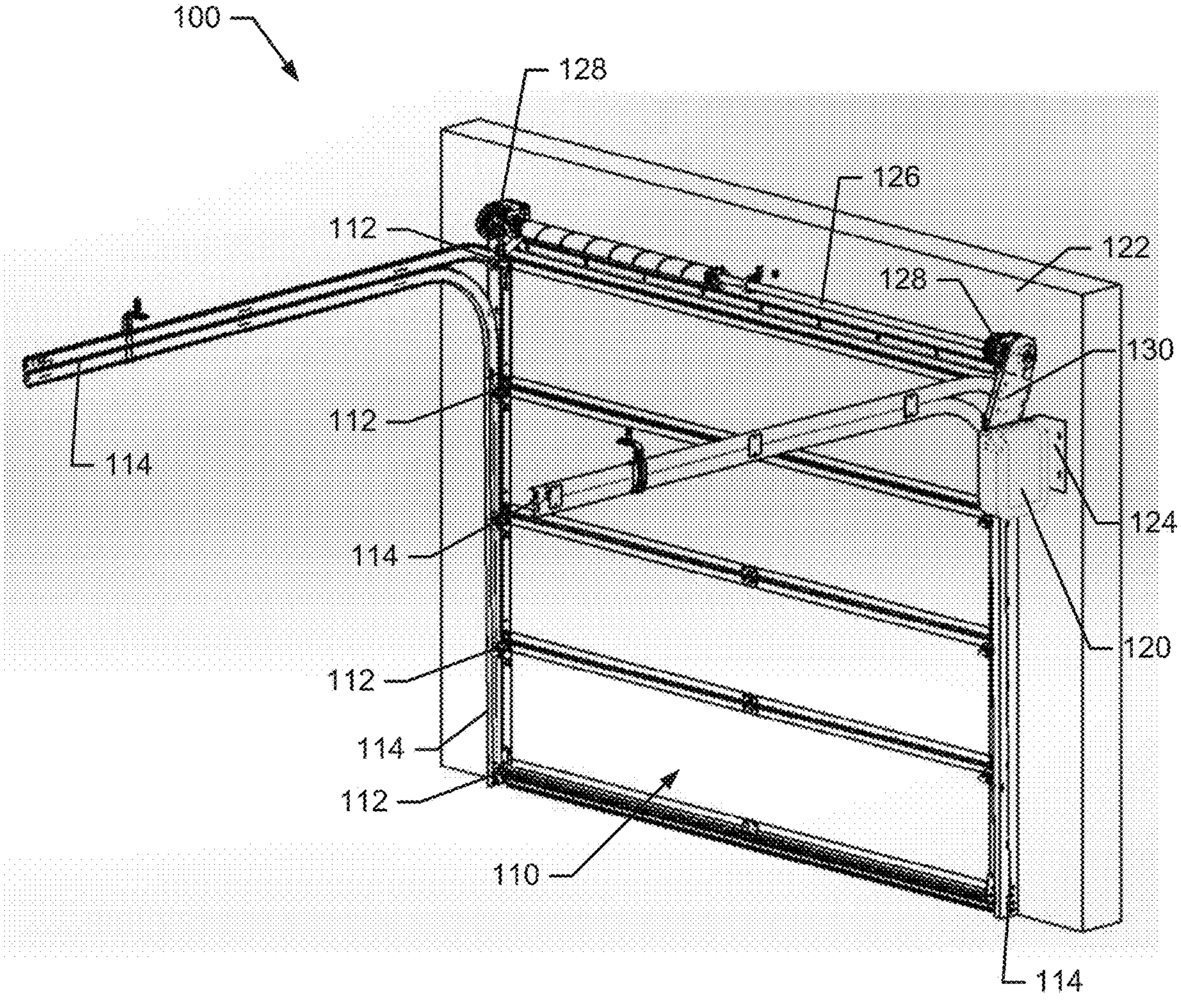
FIG. 1 illustrates a perspective view of a GDO system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, it may be desirable to provide a conversion kit from trolley configuration to jackshaft configuration, which does not alter the tensioning of components in the transmission component that acts an adapter between the GDO motor and the shaft to which the drums and cables are operably coupled. Example embodiments may provide such a conversion kit that accomplishes this to result in a complete and multifunctional system that can be installed on either side of the sectional door and provide a manual release that does not alter component tensioning. Moreover, the solution of example embodiments may be effectively housed entirely within the transmission component's housing so that there is no opportunity for pinching or other interaction with fingers or body parts of operators, installers, or anyone else.

FIG. 1 illustrates a GDO system 100 of an example embodiment. In this regard, FIG. 1 shows a sectional door 110, in which each section of the door has wheels 112 operably coupled to opposing lateral sides of each section. The wheels 112 ride in rails 114 disposed on opposing sides of the sectional door 110 as the sectional door 110 transitions between open and closed positions. The sectional door 110 of FIG. 1 is shown in the closed position, where the wheels 112 are in a vertical section of the rails 114. Thus, it can be appreciated that in the open position the wheels 112 are located in a horizontally extending portion of the rails 114.

FIG. 1 also illustrates a GDO unit referred to as opener 120. The opener 120 of this example may be converted from trolley configuration (not shown) to a jackshaft configuration, which is shown in FIG. 1. In the trolley configuration, a guide rail may extend parallel to and approximately midway between the horizontally extending portion of the rails 114. The opener 120 may be mounted (e.g., from the ceiling) proximate to an end of the guide rail to drive a trolley along the guide rail via a belt, cable or chain. The belt, cable or chain may also be operably coupled (e.g., via the trolley) to a top portion of the sectional door 110. As noted above, the trolley may be manually released from the sectional door 110 to allow for manual repositioning of the sectional door 110.

The opener 120 may be converted to a jackshaft configuration by mounting the opener 120 to an interior wall 122 proximate to one of the rails 114 via a bracket assembly 124, and operably coupling the opener 120 to a drive tube 126 of the system 100. The opener 120 may then turn the drive tube 126 and thereby also turn a drum 128 disposed at each opposing end of the drive tube 126. The drum 128 may coil and uncoil cable for operation to close and open the sectional door 110 responsive to turning initiated by the opener 120. The opener 120 may be operably coupled to the drive tube 126 via a transmission assembly 130. The transmission assembly 130 may include componentry for adapting drive speeds and torque from those applicable to the trolley configuration to those applicable to the jackshaft configuration. As an example, the transmission assembly 130 may include gearing and a flexible coupler (e.g., a belt, cable or chain) that extends between gears of such gearing with input coupling provided to an output of the opener 120, and output coupling provided to the drive tube 126.

In this example, the opener 120 is disposed on a right side of the sectional door 110 (from the interior perspective). However, some embodiments may allow the bracket assembly 124 to be repositioned relative to the opener 120 so that the opener 120 may alternatively be mounted on the left side of the sectional door 110. As yet another alternative, the transmission assembly 130 could be reversed in direction to accommodate mounting on either side of the sectional door 110.

Figure 2:
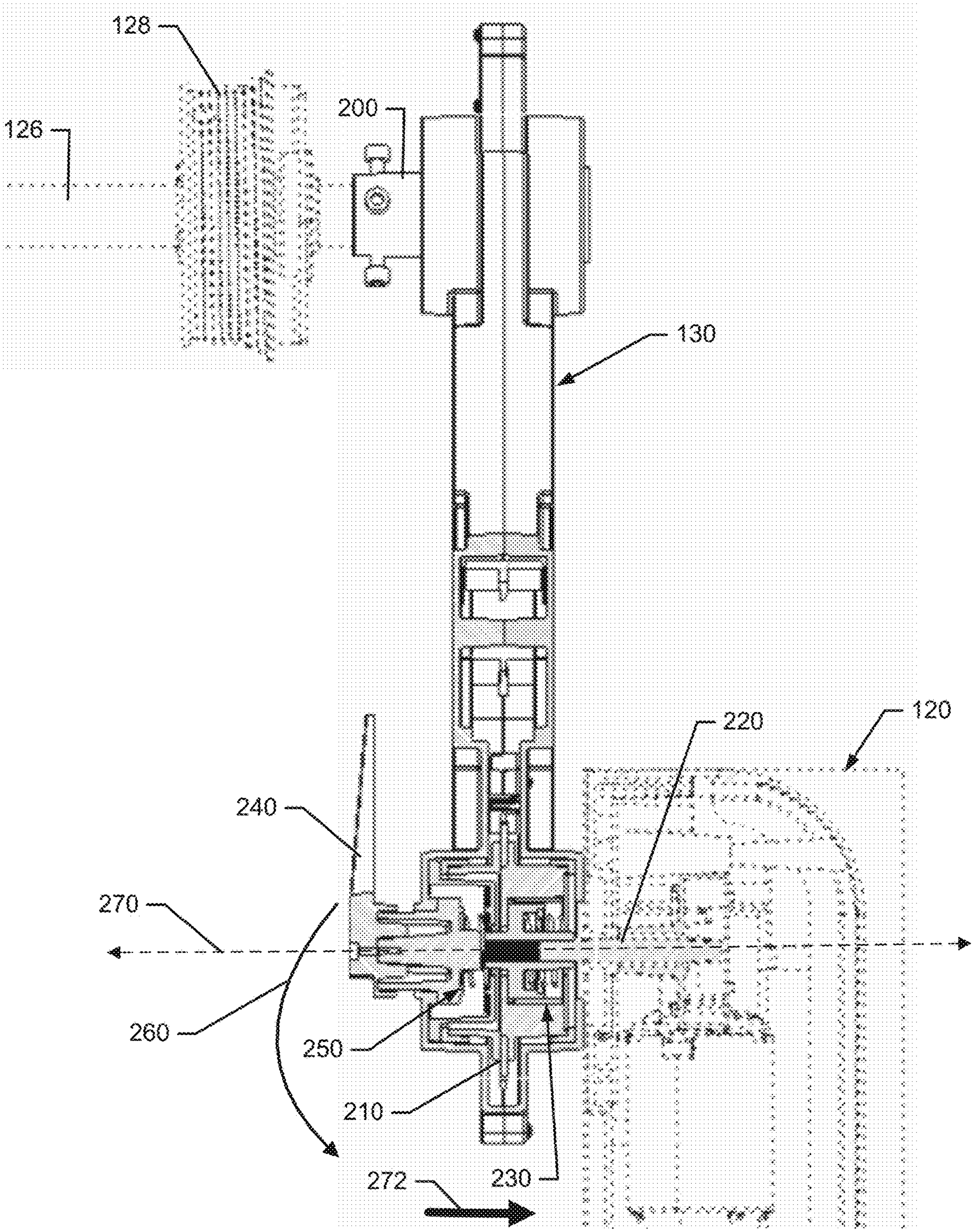
FIG. 2 shows a partial cross section view of a transmission assembly having a releasable coupling assembly and an engagement assembly operable by a handle in accordance with an example embodiment.

As can be appreciated from the description above, it may be desirable to implement a release assembly to enable the opener 120 to be decoupled from the drive tube 126 in the transmission assembly 130, which may be part of a conversion kit to allow reconfiguration of the opener 120 between the trolley configuration and the jackshaft configuration. FIG. 2 illustrates a partial cross section view of the transmission assembly 130 of an example embodiment.

Referring now to FIG. 2, only the components of the transmission assembly 130 are shown in solid lines. Other components are dashed. The transmission assembly 130 of this example embodiment includes an output coupler 200 that is operably coupled to the drive tube 126 proximate to one of the drums 128. The output coupler 200 may be operably coupled to a pulley or gear within the transmission assembly 130 that may be in turn operably coupled to a pinion 210 via a chain, cable, belt or other such flexible coupling member. The pinion 210 may be at an opposite longitudinal end of the transmission assembly 130 relative to the output coupler 200.

In an example embodiment, the pinion 210 may be selectively operably coupled to a motor output shaft 220 of the opener 120. In this regard, the motor output shaft 220 may extend in a direction substantially perpendicular to a plane in which the pinion 210 lies, and in which the chain, cable or belt extends toward the output coupler 200 of the transmission assembly 130. The selective aspect of the operable coupling between the pinion 210 and the motor output shaft 220 may be provided by a releasable coupling assembly 230. The releasable coupling assembly 230 may have an engaged state in which movement of the motor output shaft 220 is transferred to the pinion 210 (and consequently through the chain, cable or belt to the output coupler 200 to the drive tube 126), and a disengaged state in which movement of the motor output shaft 220 is not transferred to the pinion 210. The disengaged state may, however, not alter the tensioning, positioning, alignment, etc. of the chain, cable or belt.

In order to transition between the engaged and disengaged states of the releasable coupling assembly 230, the transmission assembly 130 may further include an operable member (e.g., operating lever, or handle 240), and a cam operated engagement assembly 250 that is operably coupled to the handle 240 and to the releasable coupling assembly 230. In this regard, when the handle 240 is in a first position (shown in FIG. 2), the engagement assembly 250 may position the releasable coupling assembly 230 (or enable such positioning) in the engaged state (as shown in FIG. 2). As noted above, in the engaged state the movement of the motor output shaft 220 may be transferred to the pinion 210. Meanwhile, when the handle 240 is rotated (as shown by arrow 260) the engagement assembly 250 may reposition the releasable coupling assembly 230 to the disengaged state, so that the movement of the motor output shaft 220 is not transferred to the pinion 210.

In an example embodiment, the handle 240 may be rigidly coupled (e.g., via screws or other fasteners) to the engagement assembly 250 so that a rotation of the handle 240 of, for example, 180 degrees causes a corresponding 180 degree rotation of the engagement assembly 250. The rotation of the engagement assembly 250 may cause axial translation of both the handle 240 and the engagement assembly 250 along an axis 270 of the motor output shaft 220 (e.g., due to the cam which will be described in greater detail below). Thus, for example, when the handle 240 is rotated from the position shown in FIG. 2, in the direction of arrow 260, the handle 240 and the engagement assembly 250 may translate along the axis 270 in the direction of arrow 272. A portion of the engagement assembly 250 may contact or otherwise urge movement of the releasable coupling assembly 230 also in the direction of arrow 272, and such movement may cause the releasable coupling assembly 230 to disengage from the pinion 210 (directly or indirectly through other intermediate components) to transition the releasable coupling assembly 230 to the disengaged state.

Figure 3:
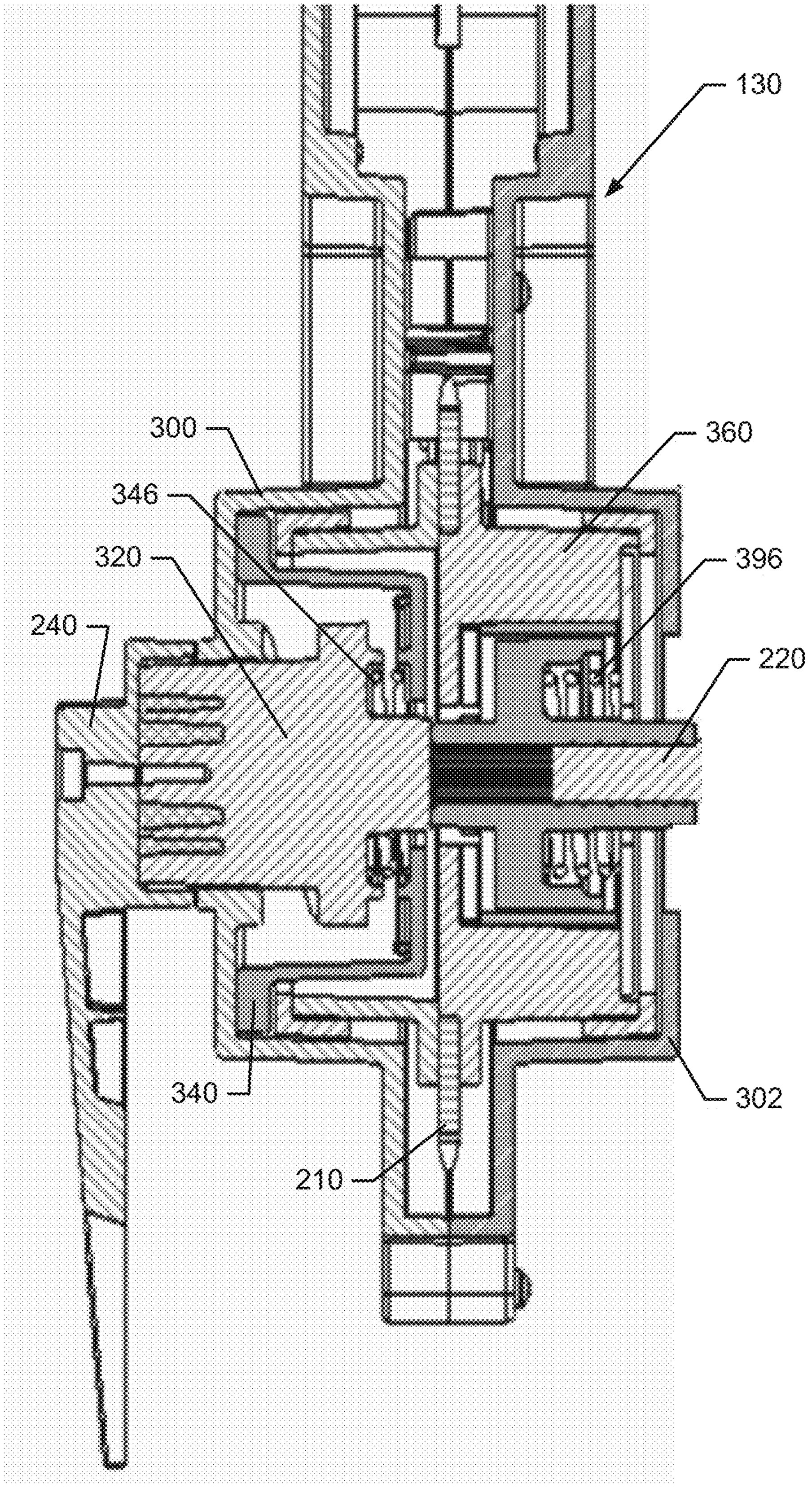
FIG. 3 illustrates a cross section view of components forming the releasable coupling assembly and the engagement assembly with the releasable coupling assembly in the disengaged state according to an example embodiment.
Figure 4:
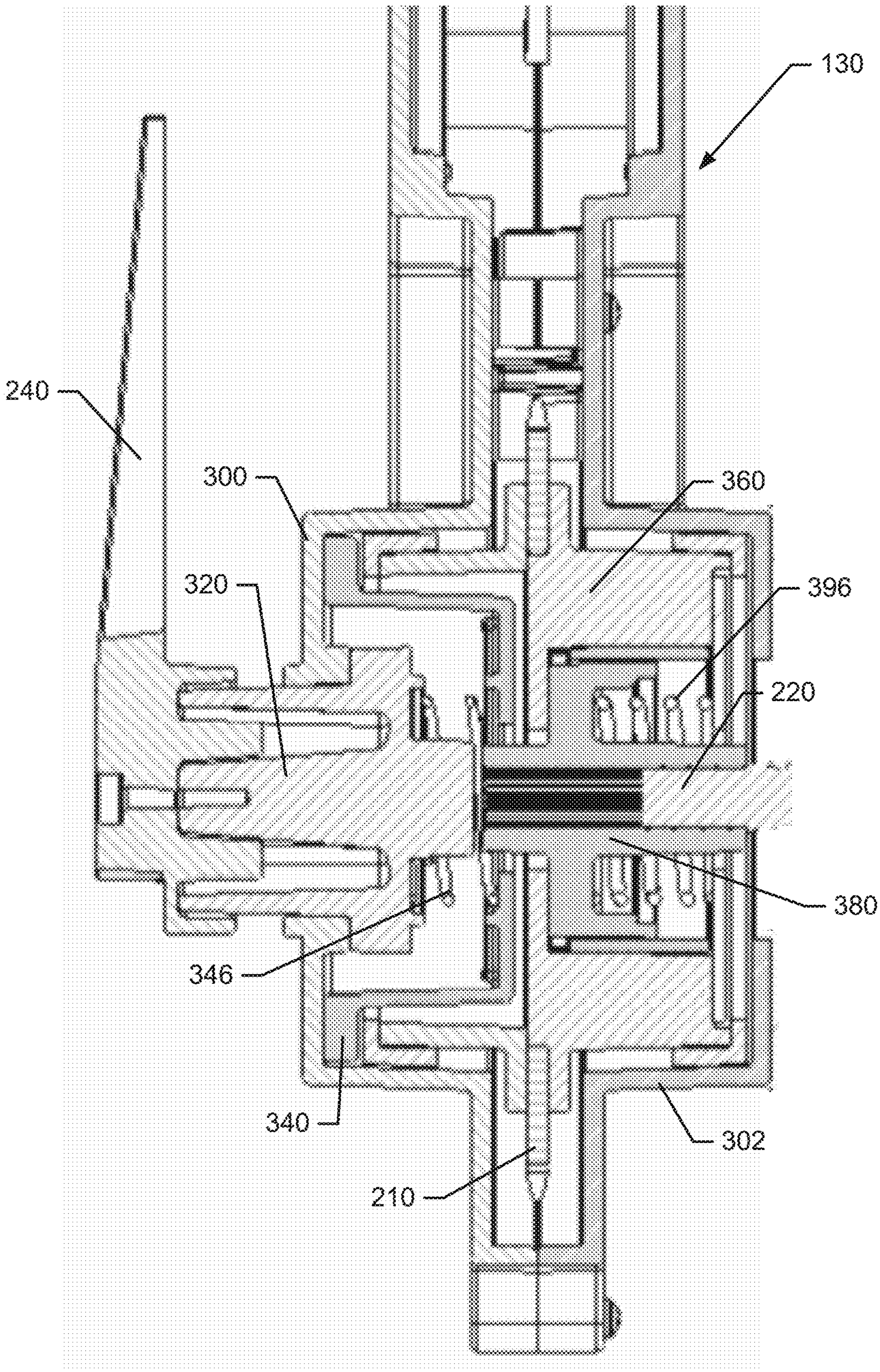
FIG. 4 shows a cross section view of the components forming the releasable coupling assembly and the engagement assembly with the releasable coupling assembly in the engaged state according to an example embodiment.
Figure 5:
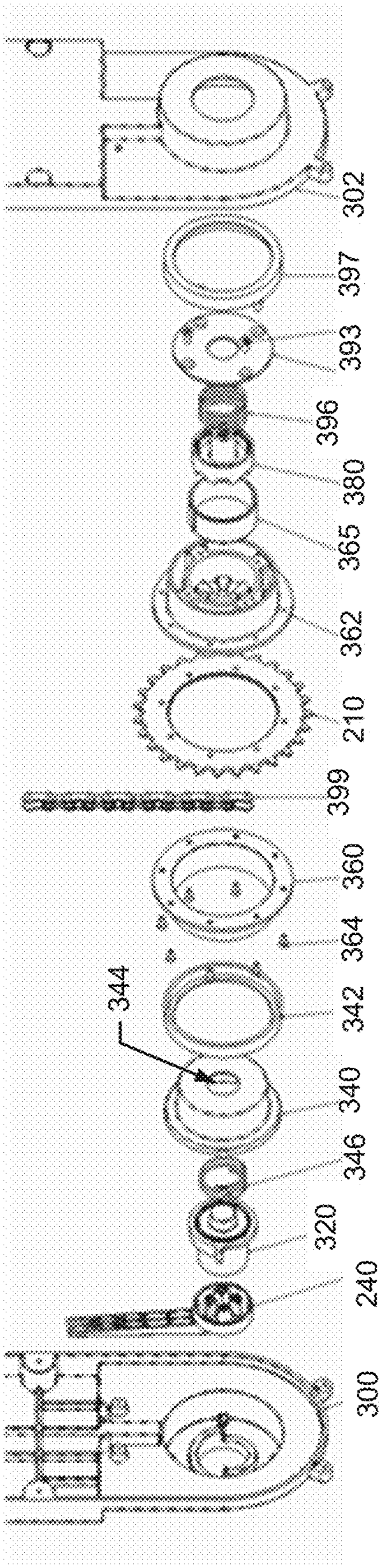
FIG. 5 shows a perspective, exploded view of various components of the transmission assembly according to an example embodiment.
Figure 6:
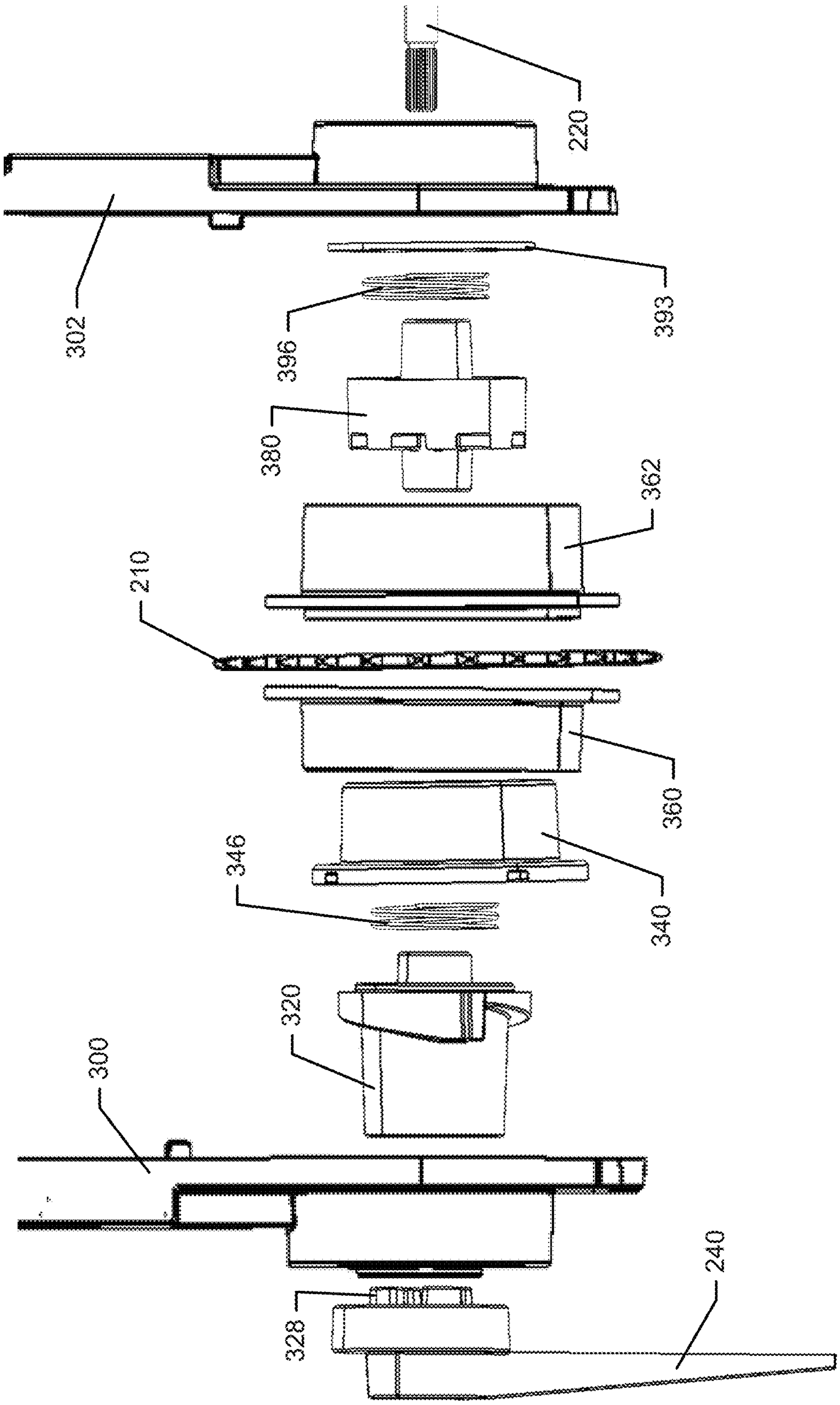
FIG. 6 illustrates some of the components of FIG. 5 in an exploded side view in accordance with an example embodiment.

FIG. 3 shows the releasable coupling assembly 230 in the disengaged state, and FIG. 4 shows the releasable coupling assembly 230 in the engaged state. FIG. 5 is a perspective, exploded view of various components of the transmission assembly 130, whereas FIG. 6 shows some of the components from FIG. 5 exploded in a side view. Meanwhile, FIGS. 7-13 show various views of individual components that may be used to instantiate the releasable coupling assembly 230 and the engagement assembly 250 to facilitate further discussion of the operation of the releasable coupling assembly 230 and the engagement assembly 250 in accordance with an example embodiment.

Referring now to FIGS. 3-13, the transmission assembly 130 may include a housing that may have multiple parts to facilitate ease of manufacture. For example, the housing may have two moldable half shells (e.g., first cover member 300 and second cover member 302) to contain the releasable coupling assembly 230 and the engagement assembly 250, along with the pinion 210 and the other supporting internal components of the transmission assembly 130. The first cover member 300 may include a handle aperture 310 through which the handle 240 may protrude into the transmission assembly 130 to engage the engagement assembly 250. Meanwhile, surrounding an interior portion of the handle aperture 310, the first cover member 300 may include a first sloped wall 312 and a second sloped wall 314. The first and second sloped walls 312 and 314 may each be arcuate in shape extending to form a semicircular ramped structure or surface that changes ramp height in the axial direction (relative to axis 270). A tallest (in the axial direction) portion of the first sloped wall 312 may be adjacent a shortest portion of the second sloped wall 314. Likewise, a tallest (in the axial direction) portion of the second sloped wall 314 may be adjacent a shortest portion of the first sloped wall 312 to form a continuous wall around the handle aperture 310.

The first and second sloped walls 312 and 314 may interface with corresponding first and second sloped surfaces 322 and 324 formed at a cam base 320 that is part of the engagement assembly 250 to define two camming surfaces that interface with each other to convert rotary movement of the handle 240 into axial movement of the cam base 320 (and the handle 240). In this regard, the cam base 320 may have a first end in which receiving orifices 326 are formed, and the handle 240 may have projections 328 that extend into the receiving orifices 326 to ensure that any rotation of the handle 240 is translated to the cam base 320. Meanwhile, a second end of the cam base 320 may have a contact surface 330 that remains in contact with the releasable coupling assembly 230 to reposition the releasable coupling assembly 230 along the axis 270 responsive to axial movement of the handle 240 and the cam base 320. The axial movement of the cam base 320 may occur responsive to rotation of the handle 240, which correspondingly rotates the cam base 320 so that the first sloped wall 312 of the first cover member 300 urges the cam base 320 axially away from the first cover member 300 (carrying the handle 240 axially as well) based on interface with (and cam action with) the first sloped surface 322 of the cam base 320. Likewise, rotation of the handle 240 also causes the rotation of the cam base 320 so that the second sloped wall 314 of the first cover member 300 urges the cam base 320 axially away from the handle 240 based on interface with the second sloped surface 324 of the cam base 320.

The cam base 320 may be separated from the pinion 210 by a cam enclosure 340, which may extend laterally around external sides of the cam base 320 and extend between the pinion 210 and the cam base 320 by having a portion that extends in a plane parallel to the plane in which the pinion 210 lies. The cam enclosure 340 may also interface with the first cover member 300 to substantially enclose the cam base 320. In some embodiments, a bush 342 may extend around the cam enclosure 340, and the portion of the cam enclosure 340 that extends in the plane parallel to the plane in which the pinion 210 lies may include an axial passage 344 via which the contact surface 330 may remain in contact with the releasable coupling assembly 230 to reposition the releasable coupling assembly 230.

A biasing member (e.g., first spring 346) may be provided between the portion of the cam enclosure 340 that extends in the plane parallel to the plane in which the pinion 210 lies and the cam base 320 to bias the cam base 320 in a direction opposite arrow 272. The first spring 346 may ensure that the cam base 320 and the handle 240 are translated opposite the direction of arrow 272 when the camming action of the cam base 320 relative to the first cover member 300 does not urge the cam base 320 in the direction of arrow 272 (e.g., via the interface between the first and second sloped walls 312 and 314 and the first and second sloped surfaces 322 and 324, respectively).

In an example embodiment, the pinion 210 may be part of a pinion assembly, which may include an engagement assembly cup 360 that may enclose the cam enclosure 340, and a coupling assembly enclosure 362, which may form a portion of the releasable coupling assembly 230. In an example embodiment, the coupling assembly enclosure 362, the engagement assembly cup 360, and the pinion 210 may be separate components that are produced separately for ease of manufacture, and joined together by fasteners 364 (e.g., screws). However, it is possible that the pinion assembly could be formed as one unitary component.

As shown in FIG. 10, the coupling assembly enclosure 362 may include a cylindrical sidewall 370 that extend in the axial direction away from a base portion 372 to define a cylindrical tube. Meanwhile, the base portion 372 may be plate like, and may extend parallel to the plane in which the pinion 210 lies. The coupling assembly enclosure 362 may enclose a coupling gear 380 within at least a portion of the sidewall 370. The base portion 372 may have an axial orifice 374 formed therein through which the coupling gear 380 may directly or indirectly interface with the contact surface 330 of the cam base 320. In this example, the contact surface 330 directly contacts a first end 382 of the coupling gear 380 via the axial orifice 374 of the coupling assembly enclosure 362 and the axial passage 344 of the cam enclosure 340. More particularly, in this example, the first end 382 of the coupling gear 380 is the only part that actually passes through both the axial orifice 374 of the coupling assembly enclosure 362 and the axial passage 344 of the cam enclosure 340. However, the contact surface 330 (or another intermediate component) could pass therethrough in alternative embodiments.

The base portion 372 may have engagement structures 390 (e.g., alternating projections and reception slots, or gear teeth) formed inside the sidewalls and surrounding the axial orifice 374. The engagement structures 390 may be configured to interface with corresponding coupling structures 392 (e.g., complementary alternating projections and reception slots, or gear teeth) formed on a face of the coupling gear 380 that surrounds the first end 382, but is axially recessed from the first end 382. Meanwhile, the motor output shaft 220 may be splined over at least a portion thereof, and the coupling gear 380 may have an engagement orifice 394 that extends axially through the coupling gear 380 from the first end 382 to a second end 395 of the coupling gear 380. The engagement orifice 394 may be shaped (e.g., with corresponding axially extending exterior ridges and valleys) to engage the splines on the motor output shaft 220 so that rotation of the motor output shaft 220 is transferred to the coupling gear 380. Meanwhile, a biasing member (e.g., second spring 396) may be disposed between the coupling gear 380 and the second cover member 302 to bias the coupling gear 380 toward the pinion 210. However, in some cases, an enclosure plate 393 may be provided to enclose a portion of the coupling gear 380 inside the coupling assembly enclosure 362, and the second spring 396 may operate against the enclosure plate 393 in such cases. Although not required, a second bush 397 may be provided to extend around the coupling assembly enclosure 362 as well.

As can be appreciated from the description above, when the handle 240 is positioned as shown in FIG. 4, the first spring 346 is enabled to urge the cam base 320 axially away from the pinion 210. This movement consequently allows the second spring 396 to urge the coupling gear 380 toward the pinion 210 and into engagement with the base portion 372 of the coupling assembly enclosure 362 since the contact surface 330 allows the first end 382 of the coupling gear to pass through the axial orifice 374 and the axial passage 344. The engagement orifice 394 may slide axially along the motor output shaft 220 to permit this motion, and the engagement structures 390 of the coupling assembly enclosure 362 may engage with the coupling structures 392 of the coupling gear 380. This defines the engaged state for the transmission assembly 130 since motion of the motor output shaft 220 will be coupled to the coupling gear 380 (via the splines of the motor output shaft 220 and the ridges and valleys of the engagement orifice 394), and the coupling gear 380 will be operably coupled to the coupling assembly enclosure 362, which is rigidly connected to the pinion 210. Motion of the motor output shaft 220 is therefore transferred to the pinion 210 and, via chain 399 (which is one example of a flexible coupler), to the output coupler 200 to turn the drive tube 126.

However, if the handle 240 is rotated to the position shown in FIG. 3, the camming action of the cam base 320 relative to the first cover member 300 urges the cam base 320 toward the pinion 210 overcoming the bias of the first spring 346 and translating the handle 240 and the cam base 320 axially toward the pinion 210 to compress the first spring 346. This axial movement of the cam base 320 causes the contact surface 330 to urge the first end 382 of the coupling gear 380 away from the pinion 210 to disengage the engagement structures 390 of the coupling assembly enclosure 362 from the coupling structures 392 of the coupling gear 380, overcoming the biasing force exerted by the second spring 396 on the coupling gear 380. This defines the disengaged state of the transmission assembly 130 since rotational motion of the motor output shaft 220 will not be coupled to the coupling assembly enclosure 362, and therefore not rotate the pinion 210. Motion of the motor output shaft 220 is therefore not transferred from the pinion 210 via chain 399 to the output coupler 200 to turn the drive tube 126.

As a result, if the handle 240 is in the disengaged state shown in FIG. 3, not only does rotational motion of the motor output shaft 220 not get transferred to the drive tube 126, by the drive tube 126 can be rotated (e.g., by manual opening of the sectional door 110) without transferring such rotational motion back through the transmission assembly 130 to the motor output shaft 220. The pinion 210 could therefore spin, with normal tensioning of the chain 399, in the disengaged state so that the desired manual release is obtained without encountering the irreversibility of the gear motor of the system 100.

As can be appreciated from the description of FIGS. 3-13, the engagement assembly 250 of an example embodiment may include any or all of the cam base 320, the first spring 346 and the cam enclosure 340. Moreover, in some cases, the bush 342, the first cover member 300 and/or the engagement assembly cup 360 may also be portions of the engagement assembly 250, or interface therewith. The releasable coupling assembly 230 of an example embodiment may include any or all of the coupling assembly enclosure 362, the coupling gear 380, and the second spring 396.

Accordingly, some example embodiments may provide a transmission assembly for converting a garage door operator (GDO) from a ceiling mounted configuration to a jackshaft configuration, or a GDO system including such a transmission assembly. In either case, the transmission assembly may include an output coupler for operably coupling a drive tube rotatable to alternately open and close a sectional door, a pinion assembly operably coupled to the output coupler via a flexible coupling member, a releasable coupling assembly, a handle, and a cam operated engagement assembly. The releasable coupling assembly may be operably coupled to a motor output shaft of a GDO motor. The releasable coupling assembly may have an engaged state in which rotation of the motor output shaft is transferred to the pinion assembly and a disengaged state in which the rotation of the motor is not transferred to the pinion assembly. The cam operated engagement assembly may be operably coupled to the handle and the releasable coupling assembly to transition the releasable coupling assembly between the engages state and the disengaged state based on a position of the handle.

The transmission assembly and/or a system including the same, or components thereof described above may be augmented or modified by altering individual features mentioned above or adding optional features. The augmentations or modifications may be performed in any combination and in any order. For example, in some cases, the motor output shaft may have an axis. Rotation of the handle about the axis in a first direction may cause, via camming action, translation of a portion of the engagement assembly to move along the axis toward the pinion assembly to correspondingly displace a portion of the releasable coupling assembly to transition the releasable coupling assembly to the disengaged state. In an example embodiment, rotation of the handle about the axis in a second direction may cause, via camming action, translation of the portion of the engagement assembly to move along the axis away from the pinion assembly to correspondingly displace a portion of the releasable coupling assembly to transition the releasable coupling assembly to the engaged state. In some cases, the transmission assembly may further include a first cover member. The handle may engage the engagement assembly through the first cover member, and the first cover member may include a ramped surface facing a cam base of the engagement assembly. The cam base may include a sloped surface that slides along the ramped surface responsive to rotation of the handle to provide camming action to translate the cam base along an axis of the motor output shaft toward the pinion assembly to transition the releasable coupling assembly to the disengaged state. In an example embodiment, the cam base may be biased away from the pinion assembly by a first spring to translate the cam base along the axis away from the pinion assembly to transition the releasable coupling assembly to the engaged state. In some cases, the releasable engagement assembly may include a coupling gear that selectively engages the pinion assembly to define the engaged state based on a position of the cam base along the axis. In an example embodiment, the pinion assembly may include engagement structures disposed to selectively interface with corresponding coupling structures formed on a face of the coupling gear that faces toward the pinion assembly. In some cases, the cam base may include a contact surface that urges a first end of the coupling gear out of engagement with the pinion assembly to define the disengaged state. In an example embodiment, the contact surface and the first end may move along the axis based on a position of the handle via a passage defined through the pinion assembly. In some cases, the coupling gear may be biased toward engagement with the pinion assembly by a second spring disposed between a second cover member and the coupling gear.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A transmission assembly for converting a garage door operator (GDO) from a ceiling mounted configuration to a jackshaft configuration, the transmission assembly comprising:

- an output coupler for operably coupling a drive tube rotatable to alternately open and close a sectional door;
- a pinion assembly operably coupled to the output coupler via a flexible coupling member;
- a releasable coupling assembly operably coupled to a motor output shaft of a GDO motor, the releasable coupling assembly having an engaged state in which rotation of the motor output shaft is transferred to the pinion assembly and a disengaged state in which the rotation of the motor output shaft is not transferred to the pinion assembly;
- a handle; and
- a cam operated engagement assembly operably coupled to the handle and the releasable coupling assembly to transition the releasable coupling assembly between the engaged state and the disengaged state based on a position of the handle, the transmission assembly further comprising a first cover member,
- wherein the handle engages the engagement assembly through the first cover member,
- wherein the first cover member comprises a ramped surface facing a cam base of the engagement assembly, and
- wherein the cam base comprises a sloped surface that slides along the ramped surface responsive to rotation of the handle to provide camming action to translate the cam base along an axis of the motor output shaft toward the pinion assembly to transition the releasable coupling assembly to the disengaged state.

2. The transmission assembly of claim 1, wherein the transmission assembly further comprises the first cover member and a second cover member that combine to house at least a portion of each of the output coupler, the pinion assembly, and the releasable coupling assembly therebetween.

3. The transmission assembly of claim 1, wherein the motor output shaft has an axis, wherein rotation of the handle about the axis in a first direction causes, via camming action, translation of a portion of the engagement assembly to move along the axis toward the pinion assembly to correspondingly displace a portion of the releasable coupling assembly to transition the releasable coupling assembly to the disengaged state.

4. The transmission assembly of claim 3, wherein rotation of the handle about the axis in a second direction causes, via camming action, translation of the portion of the engagement assembly to move along the axis away from the pinion assembly to correspondingly displace a portion of the releasable coupling assembly to transition the releasable coupling assembly to the engaged state.

5. The transmission assembly of claim 1, wherein the cam base is biased away from the pinion assembly by a first spring to translate the cam base along the axis away from the pinion assembly to transition the releasable coupling assembly to the engaged state.

6. The transmission assembly of claim 1, wherein the releasable engagement assembly comprises a coupling gear that selectively engages the pinion assembly to define the engaged state based on a position of the cam base along the axis.

7. The transmission assembly of claim 6, wherein the pinion assembly comprises engagement structures disposed to selectively interface with corresponding coupling structures formed on a face of the coupling gear that faces toward the pinion assembly.

8. The transmission assembly of claim 6, wherein the cam base comprises a contact surface that urges a first end of the coupling gear out of engagement with the pinion assembly to define the disengaged state.

9. The transmission assembly of claim 8, wherein the contact surface and the first end move along the axis based on a position of the handle via a passage defined through the pinion assembly.

10. The transmission assembly of claim 6, wherein the coupling gear is biased toward engagement with the pinion assembly by a second spring disposed between a second cover member and the coupling gear.

11. A garage door operator (GDO) system comprising:

a sectional door movable on rails between an open position and a closed position;

a GDO motor operable to provide power for movement of the sectional door between the open and closed positions via turning of a drive tube in a jackshaft configuration or via movement of a trolley in a ceiling mounted configuration; and a transmission assembly for enabling conversion from the ceiling mounted configuration to the jackshaft configuration, the transmission assembly comprising:

an output coupler for operably coupling a drive tube rotatable to alternately open and close a sectional door;

a pinion assembly operably coupled to the output coupler via a flexible coupling member;

a releasable coupling assembly operably coupled to a motor output shaft of the GDO motor, the releasable coupling assembly having an engaged state in which rotation of the motor output shaft is transferred to the pinion assembly and a disengaged state in which the rotation of the motor output shaft is not transferred to the pinion assembly;

a handle; and a cam operated engagement assembly operably coupled to the handle and the releasable coupling assembly to transition the releasable coupling assembly between the engaged state and the disengaged state based on a position of the handle, wherein the transmission assembly further comprises a first cover member, wherein the handle engages the engagement assembly through the first cover member, wherein the first cover member comprises a ramped surface facing a cam base of the engagement assembly, and wherein the cam base comprises a sloped surface that slides along the ramped surface responsive to rotation of the handle to provide camming action to translate the cam base along an axis of the motor output shaft toward the pinion assembly to transition the releasable coupling assembly to the disengaged state.

12. The system of claim 11, wherein the transmission assembly further comprises the first cover member and a second cover member that combine to house at least a portion of each of the output coupler, the pinion assembly, and the releasable coupling assembly therebetween.

13. The system of claim 11, wherein the motor output shaft has an axis, wherein rotation of the handle about the axis in a first direction causes, via camming action, translation of a portion of the engagement assembly to move along the axis toward the pinion assembly to correspondingly displace a portion of the releasable coupling assembly to transition the releasable coupling assembly to the disengaged state.

14. The system of claim 13, wherein rotation of the handle about the axis in a second direction causes, via camming action, translation of the portion of the engagement assembly to move along the axis away from the pinion assembly to correspondingly displace a portion of the releasable coupling assembly to transition the releasable coupling assembly to the engaged state.

15. The system of claim 11, wherein the cam base is biased away from the pinion assembly by a first spring to translate the cam base along the axis away from the pinion assembly to transition the releasable coupling assembly to the engaged state.

16. The system of claim 11, wherein the releasable engagement assembly comprises a coupling gear that selectively engages the pinion assembly to define the engaged state based on a position of the cam base along the axis.

17. The system of claim 16, wherein the pinion assembly comprises engagement structures disposed to selectively interface with corresponding coupling structures formed on a face of the coupling gear that faces toward the pinion assembly.

18. The system of claim 16, wherein the cam base comprises a contact surface that urges a first end of the coupling gear out of engagement with the pinion assembly to define the disengaged state.

19. The system of claim 18, wherein the contact surface and the first end move along the axis based on a position of the handle via a passage defined through the pinion assembly.

20. The system of claim 16, wherein the coupling gear is biased toward engagement with the pinion assembly by the second spring disposed between the second cover member and the coupling gear.

* * * * *